US006979125B2

(12) United States Patent
Vicars

(10) Patent No.: US 6,979,125 B2
(45) Date of Patent: Dec. 27, 2005

(54) ROD-GUIDED CROSSHEAD ASSEMBLY

(75) Inventor: Berton L. Vicars, Odessa, TX (US)

(73) Assignee: Gardner Denver, Inc., Quincy, IL (US)

( * ) Notice: Subject to any disclaimer, the term of this patent is extended or adjusted under 35 U.S.C. 154(b) by 0 days.

(21) Appl. No.: 10/430,008

(22) Filed: May 6, 2003

(65) Prior Publication Data
US 2004/0223669 A1 Nov. 11, 2004

(51) Int. Cl.[7] ............................................... F16C 5/00
(52) U.S. Cl. ...................................................... 384/11
(58) Field of Search .............................. 384/11; 74/44, 74/49, 50; 92/128, 140

(56) References Cited

U.S. PATENT DOCUMENTS

| 812,745 | A | * | 2/1906 | Hooley | 384/11 |
|---|---|---|---|---|---|
| 928,234 | A | | 7/1909 | Myers | |
| 930,405 | A | | 8/1909 | Myers | |
| 1,178,555 | A | | 4/1916 | Thomson | |
| 1,436,915 | A | | 11/1922 | Shoemaker | |
| 1,668,976 | A | | 5/1928 | Peet et al. | |
| 1,701,432 | A | * | 2/1929 | Vaughan et al. | 384/11 |
| 2,328,918 | A | * | 9/1943 | McManus | 384/11 |
| 2,510,833 | A | * | 6/1950 | Pennington | 384/11 |
| 2,682,433 | A | * | 6/1954 | Maier | 384/11 |
| 2,740,382 | A | * | 4/1956 | Morgan | 92/13 |
| 2,951,471 | A | | 9/1960 | Hill | |
| 6,378,418 | B1 | | 4/2002 | Parge | |

* cited by examiner

Primary Examiner—Thomas R. Hannon
(74) Attorney, Agent, or Firm—James B. Conte; Barnes & Thornburg LLP

(57) ABSTRACT

A rod-guided crosshead assembly for use in a pump or similar machine. The assembly includes a crosshead having a rigid body with a pair of parallel passageways passing from the front to the rear of the body. The body also has a rearwardly opening cavity between the parallel passageways for receiving the ring-shaped link of a crank arm. Further, the body has a transverse aperture intersecting the cavity for receiving a pivot pin capable of passing through the ring-shaped link to pivotally connect the crank arm to the crosshead. The body additionally has a connecting rod extending from the front thereof for connecting to a reciprocating machine part. A conduit connects the parallel passageways and places them in fluid communication with one another. A pair of parallel guide rods extends through the parallel passageways. One of the guide rods is hollow so as to define an elongated aperture therein and has a peripheral groove around its exterior surface. A transverse passageway connects the peripheral groove and the elongated aperture. A pressurized oil source is in fluid communication with the elongated aperture so that oil supplied thereto travels to the parallel passageways to lubricate the crosshead as it moves on the guide rods.

10 Claims, 2 Drawing Sheets

US 6,979,125 B2

ROD-GUIDED CROSSHEAD ASSEMBLY

FIELD OF THE INVENTION

The present invention relates generally to bearings and, more particularly, linear bearings for crossheads.

BACKGROUND OF THE INVENTION

Crossheads have long been used in motors, pumps, compressors and other machines to smoothly convert rotational motion into linear motion. As is well known, conventional crossheads slide linearly between a pair of cupped guides at their tops and bottoms. These guides have always been difficult to lubricate and have tended to wear unevenly, imparting a wobbling motion to a crosshead as it moves. Unfortunately, in cases where a crosshead is connected to a piston as in a pump, crosshead wobble has been found to break down the packing surrounding the piston and cause the pump to leak. Leaks of this sort often require costly and time-consuming repairs made worse by the lost value of the broken machine's output during the repair period.

SUMMARY OF THE INVENTION

In light of the problems associated with the known crossheads, it is a principal object of the invention to provide a crosshead assembly that is supplied with lubricant under pressure to minimize guide wear and that is strongly supported at its top and bottom to maintain crosshead alignment and prevent wobbling over time. Such an assembly, it is believed, offers a greater service life than any known crossheads and reduces the operating cost of the machine into which the assembly is installed.

It is another object of the invention to provide a crosshead assembly of the type described that is easier and less costly to install than conventional crossheads. Installation work can be undertaken with conventional tools and with minimal instruction.

It is an object of the invention to provide improved elements and arrangements thereof in a crosshead assembly for the purposes described which is lightweight in construction, inexpensive to manufacture, and dependable in use.

Briefly, the crosshead assembly in accordance with this invention achieves the intended objects by featuring a crosshead slidably mounted upon a pair of guide rods. The crosshead connects a pivoting crank arm to a reciprocating connecting rod and is provided with parallel passageways for receiving the guide rods. A pair of tubular bushings is positioned in the passageways, each of which is provided with an annular groove serving as an oil reservoir. A conduit connects the annular grooves of each bushing together and provides a pathway along which oil may flow to lubricate the guide rods. One of the guide rods is hollow and has a peripheral groove around its exterior surface in addition to a transverse passageway that connects the peripheral groove to the interior of the guide rod. By connecting a pressurized oil source to the hollow guide rod, oil is forced from the hollow guide rod onto its exterior surface, lubricating such, and onto the other guide rod via the conduit.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
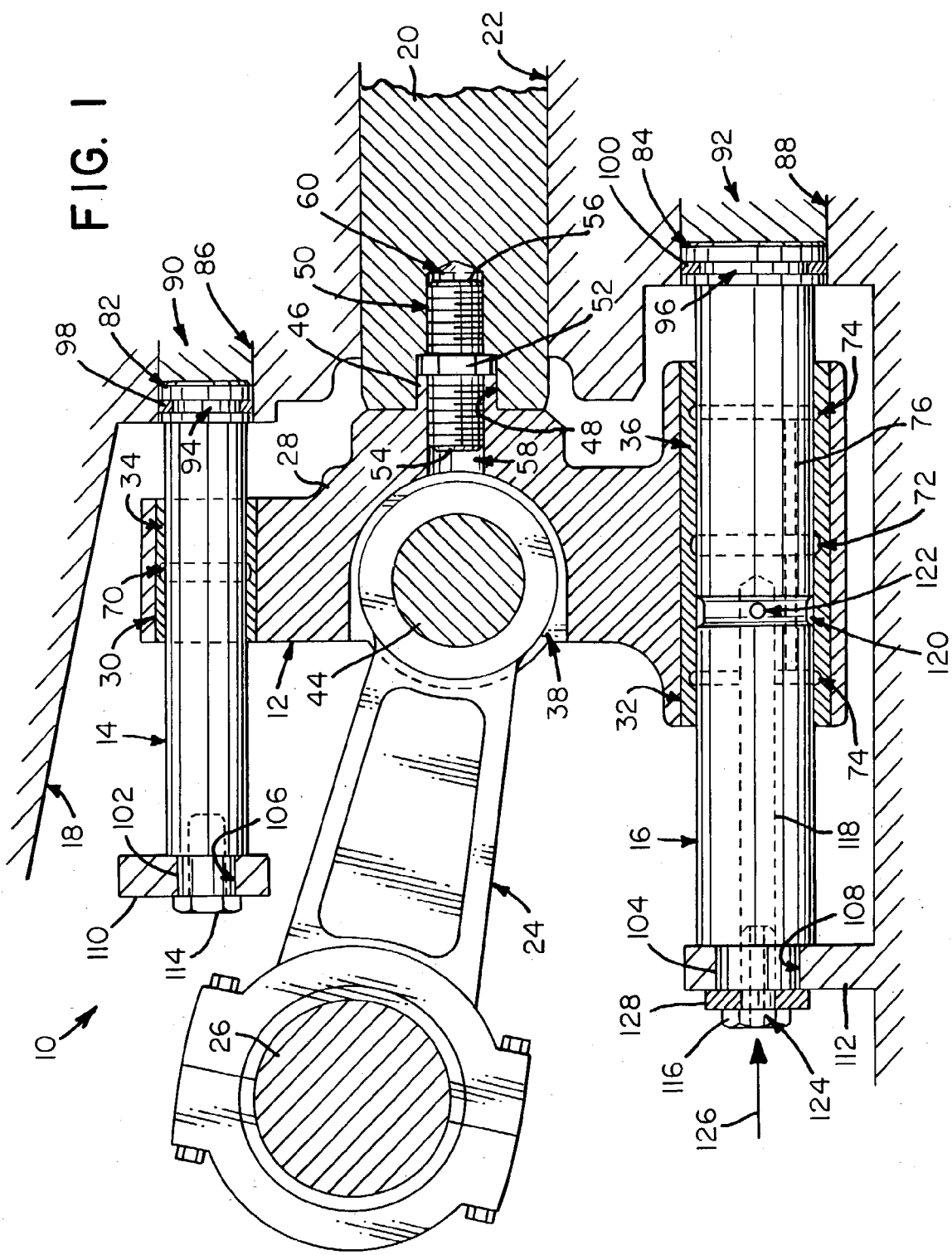
FIG. 1 is a side elevational view of a rod-guided crosshead assembly in accordance with the present invention having portions removed to reveal details thereof.

Referring now to the FIGS., a rod-guided crosshead assembly in accordance with the present invention is shown at 10. Assembly 10 includes a crosshead 12 slidably mounted on a pair of guide rods 14 and 16 affixed within a pump 18. A piston 20 is connected to the front of crosshead 12 and is snugly fitted in a bore 22 in pump 18 adjacent rods 14 and 16. A crank arm 24 extends from the rear of crosshead 12 and is connected to the drive shaft 26 of pump 18. In use, crosshead 12 converts the rotary motion of crank arm 24 into linear motion such that piston 20 is reciprocated in bore 22 to pressurize a fluid located in bore 22.

Crosshead 12 includes an elongated body 28 having parallel passageways 30 and 32 at its top and bottom. Passageways 30 and 32 open toward the front and rear of body 28 and carry tubular bushings 34 and 36. Located between passageways 34 and 36 is a cavity 38 that opens toward the rear of body 28 and receives the ring-shaped link 40 at one end of crank arm 24. A transverse aperture 42 in body 28 intersects cavity 38 and snugly receives a pivot pin 44 that passes through link 40 to pivotally connect crank arm 24 to crosshead 12. A connecting rod 46 projects from the front of body 28 and is inserted into an opening 48 in piston 20.

A threaded fastener 50 projects outwardly from connecting rod 46 to secure piston 20 to crosshead 12. Threaded fastener 50 has a hexagonal head 52 with threaded shafts 54 and 56 extending from its opposite sides. Threaded shaft 54 fits within a threaded bore 58 extending longitudinally through connecting rod 46 of crosshead 12. Threaded shaft 56, however, fits within a threaded bore 60 at the front of opening 48 in piston 20. A conventional wrench (not shown) is employed to selectively screw the threaded fastener 50 into piston 20 and crosshead 12.

Elongated body 28 is provided with a pair of threaded bores 62 and 64 that open into passageways 30 and 32. Screwed into bores 62 and 64 are releasable hose couplings 66. A hose 68 connects couplings 66 together and places bores 62 and 64 in fluid communication with one another. Thus, bores 62 and 64, couplings 66, and hose 68 comprise a conduit connecting passageways 30 and 32 and, as will be described below, the interiors of bushings 34 and 36.

Tubular bushings 34 and 36 encircle guide rods 14 and 16 and ride upon them. Bushing 34 is provided with an annular groove 70 at its midpoint that serves as a reservoir for a lubricating oil. Bushing 36, on the other hand, has an annular groove 72 at its midpoint and additional annular grooves 74 located on opposite sides of annular groove 72. A longitudinal groove 76 in bushing 36 connects annular grooves 72 and 74 together. Thus, oil in annular groove 72 is free to flow to annular grooves 74 via longitudinal groove 76.

Figure 2:
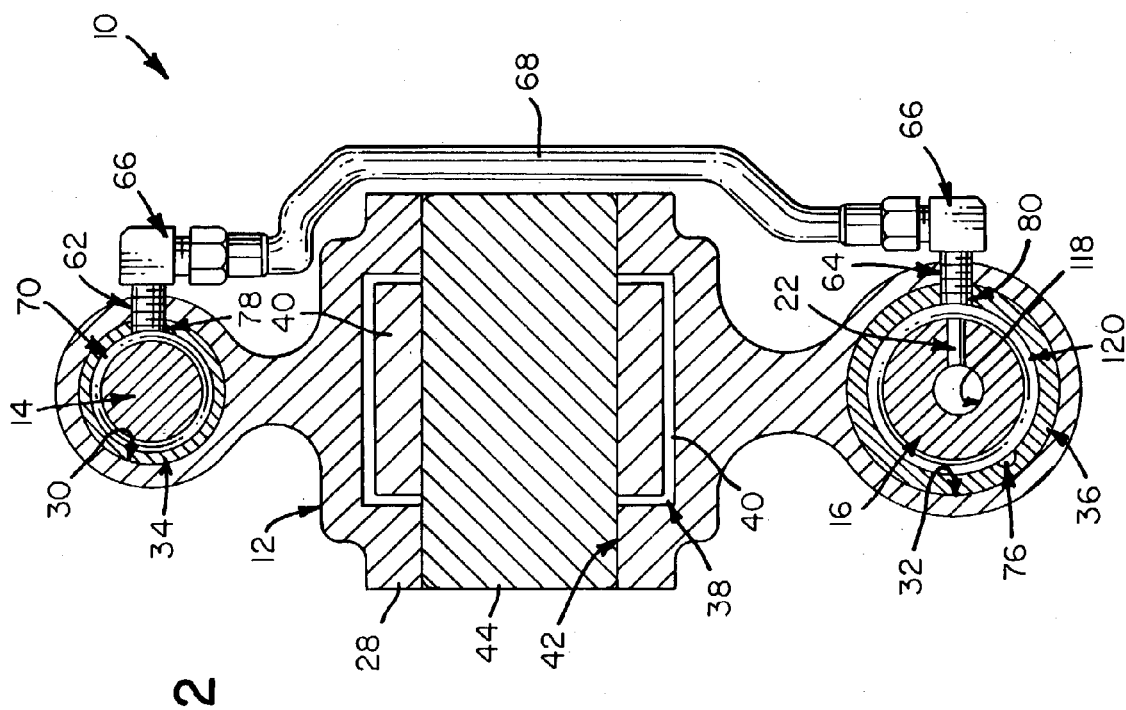
FIG. 2 is a rear elevational view of the crosshead assembly of FIG. 1 having portions removed to reveal details thereof.

Tubular bushings 34 and 36 are provided with bores 78 and 80. With reference to FIG. 2, it can be seen that bores 78 and 80 open into annular grooves 70 and 72 and are axially aligned with bores 62 and 64 in body 28. Oil, therefore, in any one of the annular grooves 72 and 74 is free to flow to annular groove 70.

It is noteworthy that bushing 36 is over twice as long as bushing 34. Further, bushing 36 has a substantially greater inner diameter than that of bushing 34 to travel on a rod 16 of greater diameter. Such an arrangement increases the surface area of bushing 36 thereby decreasing the pressure it applies to rod 16 during downward power strokes of crank arm 24. Because friction and wear are reduced, the operating lives of bushing 36 and rod 16 are increased. Interestingly, since bushing 34 does not bear the same heavy loads as bushing 36, it can be made shorter and smaller to reduce the reciprocating weight of crosshead 12 without a noticeable reduction in the operating lives of bushing 34 and rod 14.

Guide rods 14 and 16 are suspended in pump 18. To accomplish this, rods 14 and 16 are provided with front end portions 82 and 84 having enlarged diameters that are snugly positioned within sockets 86 and 88 in pump 18 covered by plates 90 and 92. A circumferential groove 94 and 96 is provided in the each of the front-end portions 82 and 84 to receive a gasket 98 and 100 to seal sockets 86 and 88. The rear end portions 102 and 104 of guide rods 14 and 16 have reduced diameters to fit snugly within sockets 106 and 108 in fixed, mounting plates 110 and 112 in pump 18. Bolts 114 and 116 threaded longitudinally into rear end portions 102 and 104 clamp guide rods 14 and 16 to mounting plates 110 and 112 thereby preventing subsequent movement of guide rods 14 and 16.

The aperture 118 in guide rod 16 that receives bolt 116 extends to a location near the midpoint of guide rod 16. At this location, guide rod 16 is provided with a peripheral groove 120 around its exterior. Aperture 118 and peripheral groove 120 are placed in fluid communication by means of a transverse passageway 122 in guide rod 16. Thus, pressurized oil in aperture 118 can flow through transverse passageway 122 to peripheral groove 120.

Bolt 116 is provided with a longitudinal passageway 124 to admit oil into guide rod 16. As shown, passageway 124 provides fluid communication between a pressurized oil source, indicated schematically by the arrow 126, and aperture 118 within guide rod 16. Source 126 is preferably an oil pump of which numerous types are commercially available. To prevent the leakage of lubricating fluid from aperture 118, a washer 128 is positioned on the threaded shaft of bolt 124 interposed between the head of bolt 124 mounting plate 112.

Use of crosshead assembly 10 is straightforward. First, with pressurized oil source 126 energized to provide a flow of oil into aperture 118 of guide rod 16, drive shaft 26 is caused to turn around its axis of rotation. Rotational motion of drive shaft 26 imparts a reciprocating motion to crosshead 12 on guide rods 14 and 16 that is transferred to piston 20 which moves in bore 22 to perform work like pumping a fluid. As crosshead 12 continues to reciprocate, oil flows from passageway 122 into peripheral groove 120 in rod 16 filling such. Because grooves 72, 74 and 76 in bushing 36 open to groove 120, they too quickly fill with lubricating oil. Since grooves 120, 72 and 74 encircle rod 36, rod 36 is always encircled in oil, keeping rod cool and minimizing the possibility of galling. Continued flow of oil from passageway 122 displaces oil in grooves 120, 72 and 74, forcing the displaced oil into hose 68 and, then, into annular groove 70 of bushing 34. Groove 70 surrounds guide rod 14 with oil, minimizing frictional forces and the wear of bushing 34 and rod 14. As oil passes out of crosshead 12 at the ends of bushings 34 and 36 at a measured rate, it is immediately replaced by more oil from source 126 that is both clean and cool thereby prolonging the operating life of assembly 10.

While the invention has been described with a high degree of particularity, it will be appreciated by those skilled in the art that modifications may be made thereto. For example, the conduit connecting the interiors of bushings 34 and 36, rather than comprising a hose, may, by suitable manufacturing and machining techniques, be formed internally within the body 28 of crosshead 12. Therefore, it is to be understood that the present invention is not limited to the sole embodiment described above, but encompasses any and all embodiments within the scope of the following claims.

I claim:

1. A rod-guided crosshead comprising:

a rigid body having a pair of parallel passageways passing from the front to the rear of said body for receiving a pair of guide rods; said body also having a rearwardly opening cavity between said passageways for receiving the ring-shaped link of a crank arm; said body further having a transverse aperture intersecting said cavity for receiving a pivot pin capable of passing through the ring-shaped link to pivotally connect the crank arm to said crosshead; and said body additionally having a connecting rod extending from the front thereof for connecting to a reciprocating machine part;

a conduit connecting said passageways and placing such in fluid communication with one another, and a pair of tubular bushings each being positioned within a respective one of said passageways, and wherein each of said bushings are in fluid communication with said conduit.

2. The rod-guided crosshead of claim 1 wherein at least one of said tubular bushings is provided with an annular groove serving as a lubricant reservoir and said annular groove is in fluid communication with said conduit.

3. The rod-guided crosshead of claim 1 wherein at least one of said tubular bushings is provided with a plurality of spaced apart, annular grooves serving as lubricant reservoirs and said annular grooves are in fluid communication with said conduit.

4. The rod-guided crosshead of claim 3 further comprising a longitudinal groove connecting said annular grooves and placing such in fluid communication with one another.

5. A rod-guided crosshead assembly, comprising:

a crosshead including:

a rigid body having a pair of parallel passageways passing from the front to the rear of said body; said body also having a rearwardly opening cavity between said parallel passageways for receiving the ring-shaped link of a crank arm; said body further having a transverse aperture intersecting said cavity for receiving a pivot pin capable of passing through the ring-shaped link to pivotally connect the crank arm to said crosshead; and said body additionally having a connecting rod extending from the front thereof for connecting to a reciprocating machine part; and, a conduit connecting said parallel passageways and placing such in fluid communication with one another;

a pair of parallel guide rods extending through said parallel passageways one of said guide rods being hollow so as to define an elongated aperture and having a peripheral groove around its exterior surface and a transverse passageway connecting said peripheral groove and said elongated aperture; and, a pressurized oil source being in fluid communication with said elongated aperture.

6. The assembly of claim 5 wherein said crosshead further comprises a pair of tubular bushings each being positioned within a respective one of said passageways for receiving said guide rods, and each of said bushings being in fluid communication with said conduit.

7. The assembly of claim 6 wherein at least one of said tubular bushings is provided with an annular groove serving as an oil reservoir and said annular groove is in fluid communication with said conduit.

8. The assembly of claim 6 wherein at least one of said tubular bushings is provided with a plurality of spaced apart, annular grooves serving as lubricant reservoirs and said annular grooves are in fluid communication with said conduit.

9. The assembly of claim 8 further comprising a longitudinal groove connecting said annular grooves and placing such in fluid communication with one another.

10. A rod-guided crosshead assembly, comprising:
a crosshead including:
  a rigid body having a pair of parallel passageways passing from the front to the rear of said body; said body also having a rearwardly opening cavity between said parallel passageways for receiving the ring-shaped link of a crank arm; said body further having a transverse aperture intersecting said cavity for receiving a pivot pin capable of passing through the ring-shaped link to pivotally connect the crank arm to said crosshead; and said body additionally having a connecting rod extending from the front thereof for connecting to a reciprocating machine part;

a pair of tubular bushings each being positioned within a respective one of said passageways, one of said tubular bushings being provided with a first annular groove serving as an oil reservoir, the other one of said bushings being provided with a plurality of second, spaced apart, annular grooves serving as lubricant reservoirs and a longitudinal groove connecting said second annular grooves and placing such in fluid communication wit one another; and, a conduit connecting said first and second annular grooves and placing such in fluid communication with one another;

a pair of parallel guide rods extending through said parallel passageways, one of said guide rods being hollow so as to define an elongated aperture and having a peripheral groove around its exterior surface and a transverse passageway connecting said peripheral groove to said elongated aperture; and, a pressurized oil source being in fluid communication with said elongated aperture.

* * * * *